US00RE42599E

(19) United States
(12) Reissued Patent
Wood, Jr.

(10) Patent Number: US RE42,599 E
(45) Date of Reissued Patent: Aug. 9, 2011

(54) METHOD OF ADDRESSING MESSAGES AND COMMUNICATIONS SYSTEM

(75) Inventor: Clifton W. Wood, Jr., Tulsa, OK (US)

(73) Assignee: Round Rock Research, LLC, Mount Kisco, NY (US)

( * ) Notice: This patent is subject to a terminal disclaimer.

(21) Appl. No.: 12/541,882

(22) Filed: Aug. 14, 2009
(Under 37 CFR 1.47)

Related U.S. Patent Documents

Reissue of:
(64) Patent No.: 6,282,186
Issued: Aug. 28, 2001
Appl. No.: 09/556,235
Filed: Apr. 24, 2000

U.S. Applications:
(63) Continuation of application No. 11/862,121, filed on Sep. 26, 2007, which is a continuation of application No. 10/652,573, filed on Aug. 28, 2003, now Pat. No. Re. 40,686, which is a continuation of application No. 09/026,050, filed on Feb. 19, 1998, now Pat. No. 6,061,344.

(51) Int. Cl.
*H04J 3/16* (2006.01)

(52) U.S. Cl. ..... 370/346

(58) Field of Classification Search ..... None
See application file for complete search history.

(56) References Cited

U.S. PATENT DOCUMENTS 4,075,632 A 2/1978 Baldwin et al.

(Continued)

FOREIGN PATENT DOCUMENTS

WO WO 97/48216 12/1997

OTHER PUBLICATIONS

USPTO Transaction History of related U.S. Appl. No. 09/026,043, filed Feb. 19, 1998, entitled "Method of Addressing Messages and Communications System," now U.S. Appl. No. 6,118,789.

(Continued)

*Primary Examiner* — Ajit Patel
(74) *Attorney, Agent, or Firm* — Gazdzinski & Associates, PC

(57) ABSTRACT

A method of establishing wireless communications between an interrogator and individual ones of multiple wireless identification devices, the method [comprising utilizing a tree search method to attempt to identify individual ones of the multiple wireless identification devices so as to be able to perform communications, without collision, between the interrogator and individual ones of the multiple wireless identification devices, a search tree being defined for the tree search method, the tree having multiple nodes respectively representing subgroups of the multiple wireless identification devices, wherein the interrogator transmits a command at a node, requesting that devices within the subgroup represented by the node respond, wherein the interrogator determines if a collision occurs in response to the command and, if not, repeats the command at the same node. An interrogator configured to transmit a command at a node, requesting that devices within the subgroup represented by the node respond, the interrogator further being configured to determine if a collision occurs in response to the command and, if not, to repeat the command at the same node] *includes: receiving a first signal from an interrogator in accordance with an algorithm to identify a radio frequency identification (RFID) device in a field of the interrogator, the first signal comprising a first set of bits and requesting a response from one or more RFID devices in the field selected in accordance with at least the first set of bits; responsive to receiving the first signal, determining if the first set of bits is equal to a first portion of an identifier of the RFID device, and, if so, modulating a radio frequency (RF) field, provided by the interrogator, to communicate a reply to the interrogator in accordance with the algorithm and receiving, in accordance with the algorithm, a retransmission of the first signal from the interrogator in response to the interrogator receiving the reply without detecting a collision.*

115 Claims, 3 Drawing Sheets

U.S. PATENT DOCUMENTS

| | | | | |
|---|---|---|---|---|
| 4,862,453 | A | 8/1989 | West et al. | |
| 4,926,182 | A | 5/1990 | Ohta et al. | |
| 5,142,694 | A | 8/1992 | Jackson et al. | 340/825.5 |
| 5,365,551 | A | 11/1994 | Snodgrass et al. | |
| 5,479,416 | A | 12/1995 | Snodgrass et al. | |
| 5,500,650 | A | 3/1996 | Snodgrass et al. | |
| 5,550,547 | A | 8/1996 | Chan et al. | |
| 5,583,850 | A | 12/1996 | Snodgrass et al. | |
| 5,608,739 | A | 3/1997 | Snodgrass et al. | |
| 5,621,412 | A | 4/1997 | Sharpe et al. | |
| 5,625,628 | A | 4/1997 | Heath | |
| 5,627,544 | A | 5/1997 | Snodgrass et al. | |
| 5,649,296 | A | 7/1997 | MacLellan et al. | |
| 5,805,586 | A | 9/1998 | Perreault et al. | 370/346 |
| 5,841,770 | A | 11/1998 | Snodgrass et al. | 370/449 |
| 5,966,471 | A | 10/1999 | Fisher et al. | |
| 5,974,078 | A | 10/1999 | Tuttle et al. | |
| 5,988,510 | A | 11/1999 | Tuttle et al. | |
| 6,038,455 | A | 3/2000 | Gardner et al. | |
| 6,061,344 | A | 5/2000 | Wood, Jr. | |
| 6,072,801 | A | 6/2000 | Wood, Jr. et al. | |
| 6,075,973 | A | 6/2000 | Greeff et al. | |
| 6,097,292 | A | 8/2000 | Kelly et al. | |
| 6,104,333 | A | 8/2000 | Wood, Jr. | |
| 6,118,789 | A | 9/2000 | Wood, Jr. | |
| 6,130,602 | A | 10/2000 | O'Toole et al. | |
| 6,130,623 | A * | 10/2000 | MacLellan et al. | 340/5.1 |
| 6,150,921 | A | 11/2000 | Werb et al. | |
| 6,157,633 | A | 12/2000 | Wright | |
| 6,169,474 | B1 | 1/2001 | Greeff et al. | |
| 6,177,858 | B1 | 1/2001 | Raimbault et al. | |
| 6,185,307 | B1 | 2/2001 | Johnson, Jr. | |
| 6,192,222 | B1 | 2/2001 | Greeff et al. | |
| 6,216,132 | B1 | 4/2001 | Chandra et al. | |
| 6,226,300 | B1 | 5/2001 | Hush et al. | |
| 6,229,987 | B1 | 5/2001 | Greeff et al. | |
| 6,243,012 | B1 | 6/2001 | Shober et al. | |
| 6,265,962 | B1 | 7/2001 | Black et al. | |
| 6,265,963 | B1 | 7/2001 | Wood, Jr. | |
| 6,275,476 | B1 | 8/2001 | Wood, Jr. | |
| 6,282,186 | B1 | 8/2001 | Wood, Jr. | |
| 6,288,629 | B1 | 9/2001 | Cofino et al. | |
| 6,289,209 | B1 | 9/2001 | Wood, Jr. | |
| 6,307,847 | B1 | 10/2001 | Wood, Jr. | |
| 6,307,848 | B1 | 10/2001 | Wood, Jr. et al. | |
| 6,324,211 | B1 | 11/2001 | Ovard et al. | |
| 6,415,439 | B1 | 7/2002 | Randell et al. | |
| 6,459,726 | B1 | 10/2002 | Ovard et al. | |
| 6,466,771 | B2 * | 10/2002 | Wood, Jr. | 455/101 |
| 6,483,427 | B1 * | 11/2002 | Werb | 340/10.1 |
| 6,566,997 | B1 | 5/2003 | Bradin | |
| 6,570,487 | B1 | 5/2003 | Steeves | |
| 6,707,376 | B1 | 3/2004 | Patterson et al. | |
| 6,714,559 | B1 | 3/2004 | Meier | |
| 6,771,634 | B1 | 8/2004 | Wright | |
| 6,778,096 | B1 | 8/2004 | Ward et al. | |
| 6,784,787 | B1 | 8/2004 | Atkins | |
| 6,812,824 | B1 * | 11/2004 | Goldinger et al. | 340/10.1 |
| 6,850,510 | B2 | 2/2005 | Kubler et al. | |
| 6,919,793 | B2 | 7/2005 | Heinrich et al. | |
| 6,950,009 | B1 * | 9/2005 | Nysen | 340/10.41 |
| 7,026,935 | B2 | 4/2006 | Diorio et al. | |
| 7,315,522 | B2 | 1/2008 | Wood, Jr. | |
| 7,385,477 | B2 | 6/2008 | O'Toole et al. | |
| RE40,686 | E | 3/2009 | Wood, Jr. et al. | |
| 7,672,260 | B2 | 3/2010 | Wood, Jr. | |
| 2005/0060069 | A1 | 3/2005 | Breed et al. | |
| 2009/0322491 | A1 | 12/2009 | Wood, Jr. | |

OTHER PUBLICATIONS

USPTO Transaction History of related U.S. Appl. No. 09/026,045, filed Feb. 19, 1998, entitled "Method of Addressing Messages, Method of Establishing Wireless Communications, and Communications System," now U.S. Appl. No. 6,072,801.

USPTO Transaction History of related U.S. Appl. No. 09/026,050, filed Feb. 19, 1998, entitled "Method of Addressing Messages and Communications System," now U.S. Appl. No. 6,061,344.

USPTO Transaction History of related U.S. Appl. No. 09/026,248, filed Feb. 19, 1998, entitled "Method of Addressing Messages and Communications System," now U.S. Appl. No. 6,275,476.

USPTO Transaction History of related U.S. Appl. No. 09/556,235, filed Apr. 24, 2000, entitled "Method of Addressing Messages and Communications System," now U.S. Appl. No. 6,282,186.

USPTO Transaction History of related U.S. Appl. No. 09/617,390, filed Jul. 17, 2000, entitled "Method of Addressing Messages and Communications System," now U.S. Appl. No. 6,307,847.

USPTO Transaction History of related U.S. Appl. No. 09/820,467, filed Mar. 28, 2001, entitled "Method of Addressing Messages and Communications System," now U.S. Appl. No. 7,315,522.

USPTO Transaction History of related U.S. Appl. No. 09/551,304, filed Apr. 18, 2000, entitled "Method of Addressing Messages and Establishing Communications Using a Tree Search Technique that Skips Levels," now U.S. Appl. No. 6,226,300.

USPTO Transaction History of related U.S. Appl. No. 09/773,461, filed Jan. 31, 2001, entitled "Method of Addressing Messages, Method of Establishing Wireless Communications, and Communications System," now U.S. Appl. No. 6,307,848.

USPTO Transaction History of related U.S. Appl. No. 10/652,573, filed Aug. 28, 2003, entitled ,"Method of Addressing Messages and Communications System," now U.S. Appl. No. RE40,686.

USPTO Transaction History of related U.S. Appl. No. 10/693,696, filed Oct. 23, 2003, entitled "Method and Apparatus to Select Radio Frequency Identification Devices in Accordance with an Arbitration Scheme."

USPTO Transaction History of related U.S. Appl. No. 10/693,697, filed Oct. 23, 2003, entitled "Method of Addressing Messages, Method of Establishing Wireless Communications, and Communications System."

USPTO Transaction History of related U.S. Appl. No. 11/143,395, filed Jun. 1, 2005, entitled "Method of Addressing Messages and Communications System."

USPTO Transaction History of related U.S. Appl. No. 11/270,204, filed Nov. 8, 2005, entitled "Method of Addressing Messages and Communications System."

USPTO Transaction History of related U.S. Appl. No. 11/416,846, filed May 2, 2006, entitled "Method and Apparatus for an Arbitration Scheme for Radio Frequency Identification Devices."

USPTO Transaction History of related U.S. Appl. No. 11/855,855, filed Sep. 14, 2007, entitled "Method of Addressing Messages and Communications System."

USPTO Transaction History of related U.S. Appl. No. 11/855,860, filed Sep. 14, 2007, entitled "Method of Addressing Messages and Communications System."

USPTO Transaction History of related U.S. Appl. No. 11/859,360, filed Sep. 21, 2007, entitled "Method of Addressing Messages and Communications System."

USPTO Transaction History of related U.S. Appl. No. 11/859,364, filed Sep. 21, 2007, entitled "Communications Systems for Radio Frequency Identification (RFID)."

USPTO Transaction History of related U.S. Appl. No. 11/862,121, filed Sep. 26, 2007, entitled "Method of Addressing Messages and Communications System."

USPTO Transaction History of related U.S. Appl. No. 11/862,124, filed Sep. 26, 2007, entitled "Method of Addressing Messages and Communications."

USPTO Transaction History of related U.S. Appl. No. 11/862,130, filed Sep. 26, 2007, entitled "Method of Addressing Messages and Communications System."

USPTO Transaction History of related U.S. Appl. No. 11/865,580, filed Oct. 1, 2007, entitled "Method of Addressing Messages, Method of Establishing Wireless Communications, and Communications System."

USPTO Transaction History of related U.S. Appl. No. 11/865,584, filed Oct. 1, 2007, entitled "Method and Apparatus to Manage Rfid Tags."

USPTO Transaction History of related U.S. Appl. No. 12/493,542, filed Jun. 29, 2009, entitled "Method of Addressing Messages, Method and Communications System."

USPTO Transaction History of related U.S. Appl. No. 12/541,882, filed Aug. 14, 2009, entitled "Method of Addressing Messages and Communications System."
USPTO Transaction History of related U.S. Appl. No. 12/556,530, filed Sep. 9, 2009, entitled "Method of Addressing Messages and Communications System."
USPTO Transaction History of related U.S. Appl. No. 12/604,329, filed Oct. 22, 2009, entitled "Method of Addressing Messages, Method of Establishing Wireless Communications and Communications System."

* cited by examiner

METHOD OF ADDRESSING MESSAGES AND COMMUNICATIONS SYSTEM

Matter enclosed in heavy brackets [ ] appears in the original patent but forms no part of this reissue specification; matter printed in italics indicates the additions made by reissue.

CROSS REFERENCE TO RELATED APPLICATION

[This is a Continuation] *More than one reissue application has been filed for the reissue of U.S. Pat. No. 6,282,186, which reissue applications are the initial reissue application Ser. No. 10/652,573, filed Aug. 28, 2003 and now U.S. Pat. No. RE40,686, a continuation reissue application Ser. No. 11/862,121, filed Sep. 26, 2007, a continuation reissue application Ser. No. 11/862,130, filed Sep. 26, 2007, a continuation reissue application Ser. No. 11/862,124, filed Sep. 26, 2007, and the present continuation reissue application, which is a continuation application of the reissue application Ser. No. 11/862,121, filed Sep. 26, 2007, which is a continuation application of the reissue application Ser. No. 10/652,573, filed Aug. 28, 2003, which is a reissue application of U.S. Pat. No. 6,282,186 having U.S. patent application Ser. No. 09/556,235, which is a continuation application* of U.S. patent application Ser. No. 09/026,050, filed Feb. 19, 1998, now U.S. Pat. No. 6,061,344 and titled "Method of Addressing Messages and Communications System".

TECHNICAL FIELD

This invention relates to communications protocols and to digital data communications. Still more particularly, the invention relates to data communications protocols in mediums such as radio communication or the like. The invention also relates to radio frequency identification devices for inventory control, object monitoring, determining the existence, location or movement of objects, or for remote automated payment.

BACKGROUND OF THE INVENTION

Communications protocols are used in various applications. For example, communications protocols can be used in electronic identification systems. As large numbers of objects are moved in inventory, product manufacturing, and merchandising operations, there is a continuous challenge to accurately monitor the location and flow of objects. Additionally, there is a continuing goal to interrogate the location of objects in an inexpensive and streamlined manner. One way of tracking objects is with an electronic identification system.

One presently available electronic identification system utilizes a magnetic coupling system. In some cases, an identification device may be provided with a unique identification code in order to distinguish between a number of different devices. Typically, the devices are entirely passive (have no power supply), which results in a small and portable package. However, such identification systems are only capable of operation over a relatively short range, limited by the size of a magnetic field used to supply power to the devices and to communicate with the devices.

Another wireless electronic identification system utilizes a large, board level, active transponder device affixed to an object to be monitored which receives a signal from an interrogator. The device receives the signal, then generates and transmits a responsive signal. The interrogation signal and the responsive signal are typically radio-frequency (RF) signals produced by an RF transmitter circuit. Because active devices have their own power sources, and do not need to be in close proximity to an interrogator or reader to receive power via magnetic coupling. Therefore, active transponder devices tend to be more suitable for applications requiring tracking of a tagged device that may not be in close proximity to an interrogator. For example, active transponder devices tend to be more suitable for inventory control or tracking.

Electronic identification systems can also be used for remote payment. For example, when a radio frequency identification device passes an interrogator at a toll booth, the toll booth can determine the identity of the radio frequency identification device, and thus of the owner of the device, and debit an account held by the owner for payment of toll or can receive a credit card number against which the toll can be charged. Similarly, remote payment is possible for a variety of other goods or services.

A communication system typically includes two transponders: a commander station or interrogator, and a responder station or transponder device which replies to the interrogator.

If the interrogator has prior knowledge of the identification number of a device which the interrogator is looking for, it can specify that a response is requested only from the device with that identification number. Sometimes, such information is not available. For example, there are occasions where the interrogator is attempting to determine which of multiple devices are within communication range.

When the interrogator sends a message to a transponder device requesting a reply, there is a possibility that multiple transponder devices will attempt to respond simultaneously, causing a collision, and thus causing an erroneous message to be received by the interrogator. For example, if the interrogator sends out a command requesting that all devices within a communications range identify themselves, and gets a large number of simultaneous replies, the interrogator may not be able to interpret any of these replies. Thus, arbitration schemes are employed to permit communications free of collisions.

In one arbitration scheme or system, described in commonly assigned U.S. Pat. Nos. 5,627,544; 5,583,850; 5,500,650; and 5,365,551, all to Snodgrass et al. and all incorporated herein by reference, the interrogator sends a command causing each device of a potentially large number of responding devices to select a random number from a known range and use it as that device's arbitration number. By transmitting requests for identification to various subsets of the full range of arbitration numbers, and checking for an error-free response, the interrogator determines the arbitration number of every responder station capable of communicating at the same time. Therefore, the interrogator is able to conduct subsequent uninterrupted communication with devices, one at a time, by addressing only one device.

Another arbitration scheme is referred to as the Aloha or slotted Aloha scheme. This scheme is discussed in various references relating to communications, such as Digital Communications: Fundamentals and Application, Bernard Sklar, published January 1988 by Prentice Hall. In this type of scheme, a device will respond to an interrogator using one of many time domain slots selected randomly by the device. A problem with the Aloha scheme is that if there are many devices, or potentially many devices in the field (i.e. in communications range, capable of responding) then there must be many available slots or many collisions will occur. Having many available slots slows down replies. If the magnitude of the number of devices in a field is unknown, then many slots are needed. This results in the system slowing down significantly because the reply time equals the number of slots multiplied by the time period required for one reply.

An electronic identification system which can be used as a radio frequency identification device, arbitration schemes, and various applications for such devices are described in detail in commonly assigned U.S. [patent application Ser. No. 08/705,043, filed Aug. 29, 1996, and] *Pat. No. 6,130,602, which is* incorporated herein by reference.

SUMMARY OF THE INVENTION

The invention provides a wireless identification device configured to provide a signal to identify the device in response to an interrogation signal.

*In one aspect, a method includes: receiving a first signal from an interrogator in accordance with an algorithm to identify a radio frequency identification (RFID) device in a field of the interrogator, the first signal comprising a first set of bits and requesting a response from one or more RFID devices in the field selected in accordance with at least the first set of bits; responsive to receiving the first signal, determining if the first set of bits is equal to a first portion of an identifier of the RFID device, and, if so, modulating a radio frequency (RF) field, provided by the interrogator, to communicate a reply to the interrogator in accordance with the algorithm; and receiving, in accordance with the algorithm, a retransmission of the first signal from the interrogator in response to the interrogator receiving the reply without detecting a collision.*

One aspect of the invention provides a method of establishing wireless communications between an interrogator and individual ones of multiple wireless identification devices. The method comprises utilizing a tree search method to attempt to identify individual ones of the multiple wireless identification devices so as to be able to perform communications, without collision, between the interrogator and individual ones of the multiple wireless identification devices. A search tree is defined for the tree search method. The tree has multiple nodes respectively representing subgroups of the multiple wireless identification devices. The interrogator transmits a command at a node, requesting that devices within the subgroup represented by the node respond. The interrogator determines if a collision occurs in response to the command and, if not, repeats the command at the same node.

Another aspect of the invention provides a communications system comprising an interrogator, and a plurality of wireless identification devices configured to communicate with the interrogator in a wireless fashion. The interrogator is configured to employ tree searching to attempt to identify individual ones of the multiple wireless identification devices, so as to be able to perform communications without collision, between the interrogator and individual ones of the multiple wireless identification devices. The interrogator is configured to follow a search tree, the tree having multiple nodes respectively representing subgroups of the multiple wireless identification devices. The interrogator is configured to transmit a command at a node, requesting that devices within the subgroup represented by the node respond. The interrogator is further configured to determine if a collision occurs in response to the command and, if not, to repeat the command at the same node.

One aspect of the invention provides a radio frequency identification device comprising an integrated circuit including a receiver, a transmitter, and a microprocessor. In one embodiment, the integrated circuit is a monolithic single die single metal layer integrated circuit including the receiver, the transmitter, and the microprocessor. The device of this embodiment includes an active transponder, instead of a transponder which relies on magnetic coupling for power and therefore has a much greater range.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
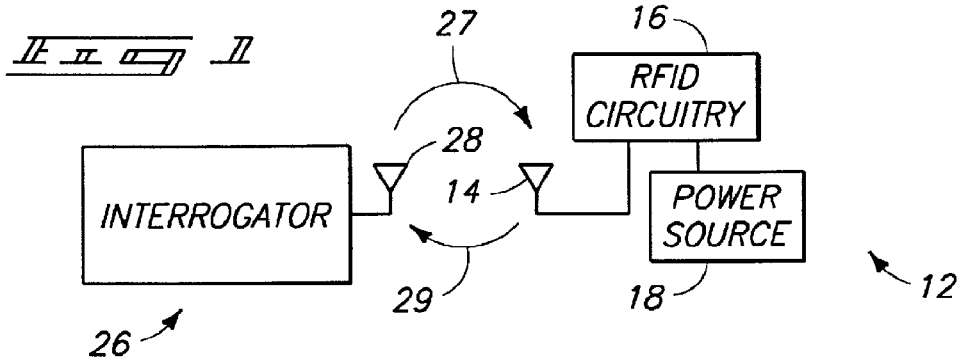
FIG. 1 is a high level circuit schematic showing an interrogator and a radio frequency identification device embodying the invention.

FIG. 1 illustrates a wireless identification device 12 in accordance with one embodiment of the invention. In the illustrated embodiment, the wireless identification device is a radio frequency data communication device 12, and includes RFID circuitry 16. The device 12 further includes at least one antenna 14 connected to the circuitry 16 for wireless or radio frequency transmission and reception by the circuitry 16. In the illustrated embodiment, the RFID circuitry is defined by an integrated circuit as described in the above-incorporated [patent application Ser. No. 08/705,043, filed Aug. 29, 1996] *U.S. Pat. No. 6,130,602*. Other embodiments are possible. A power source or supply 18 is connected to the integrated circuit 16 to supply power to the integrated circuit 16. In one embodiment, the power source 18 comprises a battery.

The device 12 transmits and receives radio frequency communications to and from an interrogator 26. An exemplary interrogator is described in commonly assigned U.S. [patent application Ser. No. 08/907,689, filed Aug. 8, 1997] *Pat. No. 6,289,209* and incorporated herein by reference. Preferably, the interrogator 26 includes an antenna 28, as well as dedicated transmitting and receiving circuitry, similar to that implemented on the integrated circuit 16.

Generally, the interrogator 26 transmits an interrogation signal or command 27 via the antenna 28. The device 12 receives the incoming interrogation signal via its antenna 14. Upon receiving the signal 27, the device 12 responds by generating and transmitting a responsive signal or reply 29. The responsive signal 29 typically includes information that uniquely identifies, or labels the particular device 12 that is transmitting, so as to identify any object or person with which the device 12 is associated. Although only one device 12 is shown in FIG. 1, typically there will be multiple devices 12 that correspond with the interrogator 26, and the particular devices 12 that are in communication with the interrogator 26 will typically change over time. In the illustrated embodiment in FIG. 1, there is no communication between multiple devices 12. Instead, the devices 12 respectively communicate with the interrogator 26. Multiple devices 12 can be used in the same field of an interrogator 26 (i.e., within communications range of an interrogator 26).

The radio frequency data communication device 12 can be included in any appropriate housing or packaging. Various methods of manufacturing housings are described in commonly assigned U.S. [patent application Ser. No. 08/800,037, filed Feb. 13, 1997, and] *Pat. No. 5,988,510 which is* incorporated herein by reference.

Figure 2:
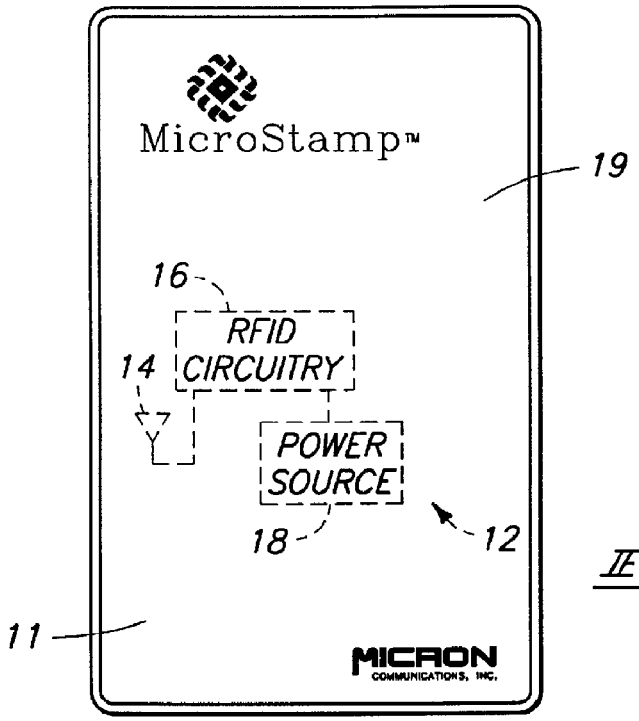
FIG. 2 is a front view of a housing, in the form of a badge or card, supporting the circuit of FIG. 1 according to one embodiment the invention.

FIG. 2 shows but one embodiment in the form of a card or badge 19 including a housing 11 of plastic or other suitable material supporting the device 12 and the power supply 18. In one embodiment, the front face of the badge has visual identification features such as graphics, text, information found on identification or credit cards, etc.

Figure 3:
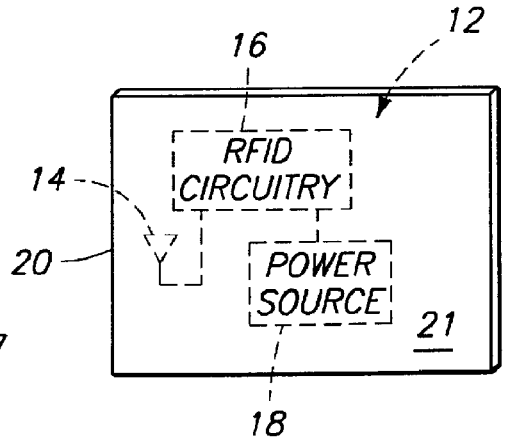
FIG. 3 is a front view of a housing supporting the circuit of FIG. 1 according to another embodiment of the invention.

FIG. 3 illustrates but one alternative housing supporting the device 12. More particularly, FIG. 3 shows a miniature housing 20 encasing the device 12 and power supply 18 to define a tag which can be supported by an object (e.g., hung from an object, affixed to an object, etc.). Although two particular types of housings have been disclosed, other forms of housings are employed in alternative embodiments.

If the power supply 18 is a battery, the battery can take any suitable form. Preferably, the battery type will be selected depending on weight, size, and life requirements for a particular application. In one embodiment, the battery 18 is a thin profile button-type cell forming a small, thin energy cell more commonly utilized in watches and small electronic devices requiring a thin profile. A conventional button-type cell has a pair of electrodes, an anode formed by one face and a cathode formed by an opposite face. In an alternative embodiment, the power source 18 comprises a series connected pair of button type cells. In other alternative embodiments, other types of suitable power source are employed.

The circuitry 16 further includes a backscatter transmitter and is configured to provide a responsive signal to the interrogator 26 by radio frequency. More particularly, the circuitry 16 includes a transmitter, a receiver, and memory such as is described in U.S. [patent application Ser. No. 08/705,043] *Pat. No. 6,130,602*.

Radio frequency identification has emerged as a viable and affordable alternative to tagging or labeling small to large quantities of items. The interrogator 26 communicates with the devices 12 via an electromagnetic link, such as via an RF link (e.g., at microwave frequencies, in one embodiment), so all transmissions by the interrogator 26 are heard simultaneously by all devices 12 within range.

If the interrogator 26 sends out a command requesting that all devices 12 within range identify themselves, and gets a large number of simultaneous replies, the interrogator 26 may not be able to interpret any of these replies. Therefore, arbitration schemes are provided.

If the interrogator 26 has prior knowledge of the identification number of a device 12 which the interrogator 26 is looking for, it can specify that a response is requested only from the device 12 with that identification number. To target a command at a specific device 12, (i.e., to initiate point-on-point communication), the interrogator 26 must send a number identifying a specific device 12 along with the command. At start-up, or in a new or changing environment, these identification numbers are not known by the interrogator 26. Therefore, the interrogator 26 must identify all devices 12 in the field (within communication range) such as by determining the identification numbers of the devices 12 in the field. After this is accomplished, point-to-point communication can proceed as desired by the interrogator 26.

Generally speaking, RFID systems are a type of multiaccess communication system. The distance between the interrogator 26 and devices 12 within the field is typically fairly short (e.g., several meters), so packet transmission time is determined primarily by packet size and baud rate. Propagation delays are negligible. In such systems, there is a potential for a large number of transmitting devices 12 and there is a need for the interrogator 26 to work in a changing environment, where different devices 12 are swapped in and out frequently (e.g., as inventory is added or removed). In such systems, the inventors have determined that the use of random access methods work effectively for contention resolution (i.e., for dealing with collisions between devices 12 attempting to respond to the interrogator 26 at the same time).

RFID systems have some characteristics that are different from other communications systems. For example, one characteristic of the illustrated RFID systems is that the devices 12 never communicate without being prompted by the interrogator 26. This is in contrast to typical multiaccess systems where the transmitting units operate more independently. In addition, contention for the communication medium is short lived as compared to the ongoing nature of the problem in other multiaccess systems. For example, in a RFID system, after the devices 12 have been identified, the interrogator can communicate with them in a point-to-point fashion. Thus, arbitration in a RFID system is a transient rather than steady-state phenomenon. Further, the capability of a device 12 is limited by practical restrictions on size, power, and cost. The lifetime of a device 12 can often be measured in terms of number of transmissions before battery power is lost. Therefore, one of the most important measures of system performance in RFID arbitration is total time required to arbitrate a set of devices 12. Another measure is power consumed by the devices 12 during the process. This is in contrast to the measures of throughput and packet delay in other types of multiaccess systems.

Figure 4:
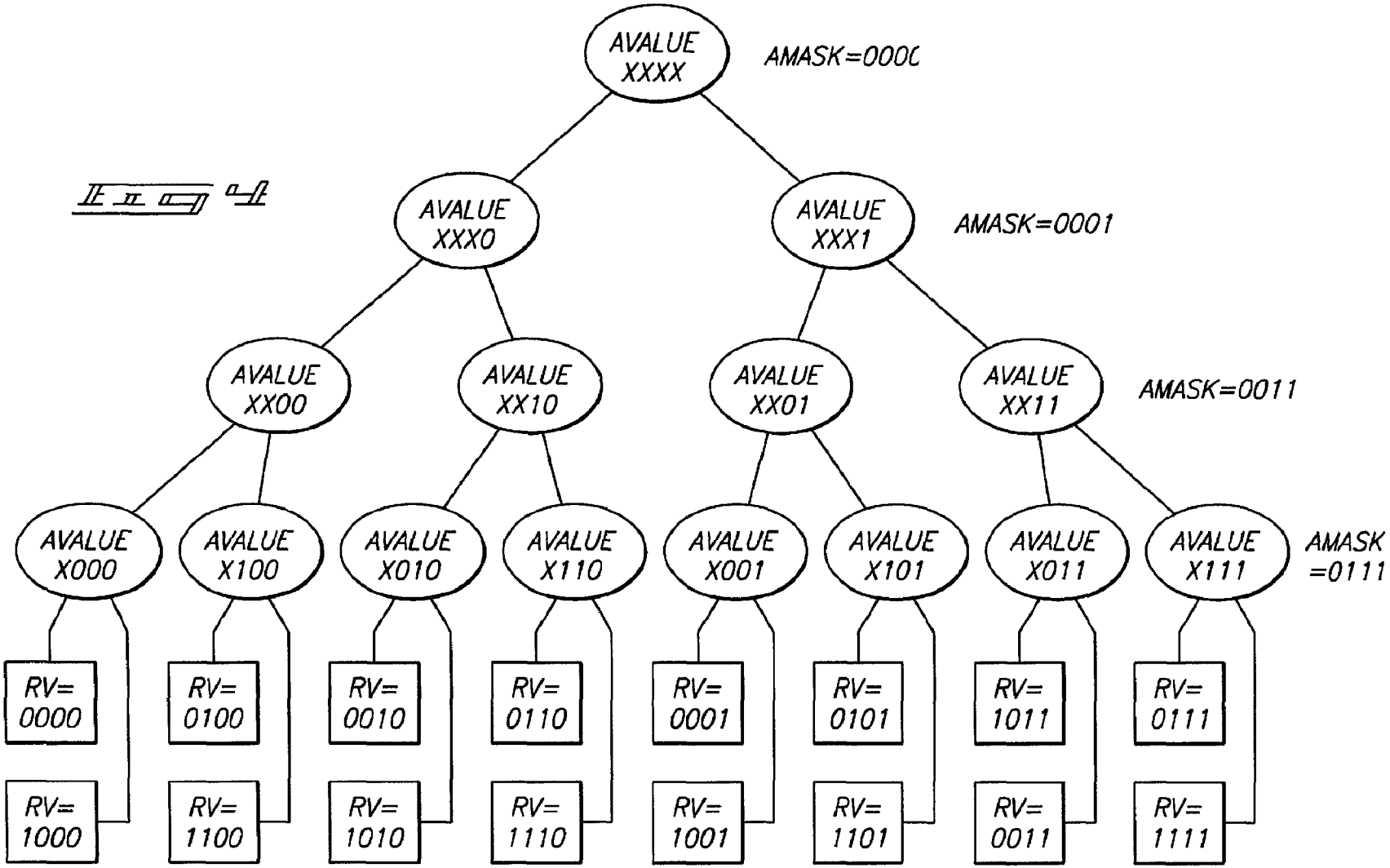
FIG. 4 is a diagram illustrating a tree splitting sort method for establishing communication with a radio frequency identification device in a field of a plurality of such devices.

FIG. 4 illustrates one arbitration scheme that can be employed for communication between the interrogator and devices 12. Generally, the interrogator 26 sends a command causing each device 12 of a potentially large number of responding devices 12 to select a random number from a known range and use it as that device's arbitration number. By transmitting requests for identification to various subsets of the full range of arbitration numbers, and checking for an error-free response, the interrogator 26 determines the arbitration number of every responder station capable of communicating at the same time. Therefore, the interrogator 26 is able to conduct subsequent unterrupted communication with devices 12, one at a time, by addressing only one device 12.

Three variables are used: an arbitration value (AVALUE), an arbitration mask (AMASK), and a random value ID (RV). The interrogator sends an Identify command (IdentifyCmnd) causing each device of a potentially large number of responding devices to select a random number from a known range and use it as that device's arbitration number. The interrogator sends an arbitration value (AVALUE) and an arbitration mask (AMASK) to a set of devices 12. The receiving devices 12 evaluate the following equation: (AMASK & AVALUE)==(AMASK & RV) wherein "&" is a bitwise AND function, and wherein "==" is an equality function. If the equation evaluates to "1" (TRUE), then the device 12 will reply. If the equation evaluates to "0" (FALSE), then the device 12 will not reply. By performing this in a structured manner, with the number of bits in the arbitration mask being increased by one each time, eventually a device 12 will respond with no collisions. Thus, a binary search tree methodology is employed.

An example using actual numbers will now be provided using only four bits, for simplicity, reference being made to FIG. 4. In one embodiment, sixteen bits are used for AVALUE and AMASK. Other numbers of bits can also be employed depending, for example, on the number of devices 12 expected to be encountered in a particular application, on desired cost points, etc.

Assume, for this example, that there are two devices 12 in the field, one with a random value (RV) of 1100 (binary), and another with a random value (RV) of 1010 (binary). The interrogator is tying to establish communications without collisions being caused by the two devices 12 attempting to communicate at the same time.

The interrogator sets AVALUE to 0000 (or "don't care" for all bits, as indicated by the character "X" in FIG. 4) and AMASK to 0000. The interrogator transmits a command to all devices 12 requesting that they identify themselves. Each of the devices 12 evaluate (AMASK & AVALUE)==(AMASK & RV) using the random value RV that the respective devices 12 selected. If the equation evaluates to "1" (TRUE), then the device 12 will reply. If the equation evaluates to "0" (FALSE), then the device 12 will not reply. In the first level of the illustrated tree, AMASK is 0000 and anything bitwise ANDed with all zeros results in all zeros, so both the devices 12 in the field respond, and there is a collision.

Next, the interrogator sets AMASK to 0001 and AVALUE to 0000 and transmits an Identify command. Both devices 12 in the field have a zero for their least significant bit, and (AMASK & AVALUE)==(AMASK & RV) will be true for both devices 12. For the device 12 with a random value of 1100, the left side of the equation is evaluated as follows (0001 & 0000)=0000.

The right side is evaluated as (0001 & 1100)=0000. The left side equals the right side, so the equation is true for the device 12 with the random value of 1100. For the device 12 with a random value of 1010, the left side of the equation is evaluated as (0001 & 0000)=0000. The right side is evaluated as (0001 & 1010)=0000. The left side equals the right side, so the equation is true for the device 12 with the random value of 1010. Because the equation is true for both devices 12 in the field, both devices 12 in the field respond, and there is another collision.

Recursively, the interrogator next sets AMASK to 0011 with AVALUE still at 0000 and transmits an Identify command. (AMASK & AVALUE)==(AMASK & RV) is evaluated for both devices 12. For the device 12 with a random value of 1100, the left side of the equation is evaluated as follows (0011 & 0000)=0000. The right side is evaluated as (0011 & 1100)=0000. The left side equals the right side, so the equation is true for the device 12 with the random value of 1100, so this device 12 responds. For the device 12 with a random value of 1010, the left side of the equation is evaluated as (0011 & 0000)=0000. The right side is evaluated as (0011 & 1010)=0010. The left side does not equal the right side, so the equation is false for the device 12 with the random value of 1010, and this device 12 does not respond; Therefore, there is no collision, and the interrogator can determine the identity (e.g., an identification number) for the device 12 that does respond.

De-recursion takes place, and the devices 12 to the right for the same AMASK level are accessed when AVALUE is set at 0010, and AMASK is set to 0011.

The device 12 with the random value of 1010 receives a command and evaluates the equation (AMASK & AVALUE)==(AMASK & RV). The left side of the equation is evaluated as (0011 & 0010)=0010. The right side of the equation is evaluated as (0011 & 1010)=0010. The right side equals the left side, so the equation is true for the device 12 with the random value of 1010. Because there are no other devices 12 in the subtree, a good reply is returned by the device 12 with the random value of 1010. There is no collision, and the interrogator 26 can determine the identity (e.g., an identification number) for the device 12 that does respond.

By recursion, what is meant is that a function makes a call to itself. In other words, the function calls itself within the body of the function. After the called function returns, de-recursion takes place and execution continues at the place just after the function call; i.e. at the beginning of the statement after the function call.

For instance, consider a function that has four statements (numbered 1,2,3,4) in it, and the second statement is a recursive call. Assume that the fourth statement is a return statement. The first time through the loop (iteration 1) the function executes the statement 2 and (because it is a recursive call) calls itself causing iteration 2 to occur. When iteration 2 gets to statement 2, it calls itself making iteration 3. During execution in iteration 3 of statement 1, assume that the function does a return. The information that was saved on the stack from iteration 2 is loaded and the function resumes execution at statement 3 (in iteration 2), followed by the execution of statement 4 which is also a return statement. Since there are no more statements in the function, the function de-recurses to iteration 1. Iteration 1, had previously recursively called itself in statement 2. Therefore, it now executes statement 3 (in iteration 1). Following that it executes a return at statement 4. Recursion is known in the art.

Consider the following code which can be used to implement operation of the method shown in FIG. 4 and described above.

```
Arbitrate(AMASK, AVALUE)
  {
    collision=IdentifyCmnd(AMASK, AVALUE) if (collision) then
      {
        /* recursive call for left side */ Arbitrate ((AMASK<<1)+1, AVALUE)
        /* recursive call for right side */ Arbitrate ((AMASK<<1)+1, AVALUE+(AMASK+1))
      } /* endif */
  }/* return */
```

The symbol "<<" represents a bitwise left shift. "<<1" means shift left by one place. Thus, 0001<<1 would be 0010. Note, however, that AMASK is originally called with a value of zero, and 0000<<1 is still 0000. Therefore, for the first recursive call, AMASK=(AMASK<<1)+1. So for the first recursive call, the value of AMASK is 0000+0001=0001. For the second call, AMASK=(0001<<)+1=0010+1=0011. For the third recursive call, AMASK=(0011<<1)+1=0110+1=0111.

The routine generates values for AMASK and AVALUE to be used by the interrogator in an Identify command "IdentifyCmnd." Note that the routine calls itself if there is a collision. De-recursion occurs when there is no collision. AVALUE and AMASK would have values such as the following assuming collisions take place all the way down to the bottom of the tree.

| AVALUE | AMASK |
|---|---|
| 0000 | 0000 |
| 0000 | 0001 |
| 0000 | 0011 |
| 0000 | 0111 |
| 0000 | 1111* |
| 1000 | 1111* |
| 0100 | 0111 |
| 0100 | 1111* |
| 1100 | 1111* |

This sequence of AMASK, AVALUE binary numbers assumes that there are collisions all the way down to the bottom of the tree, at which point the Identify command sent by the interrogator is finally successful so that no collision occurs. Rows in the table for which the interrogator is successful in receiving a reply without collision are marked with the symbol "*". Note that if the Identify command was successful at, for example, the third line in the table then the interrogator would stop going down that branch of the tree and start down another, so the sequence would be as shown in the following table.

| AVALUE | AMASK |
|---|---|
| 0000 | 0000 |
| 0000 | 0001 |
| 0000 | 0011* |
| 0010 | 0011 |
| . . . | . . . |

This method is referred to as a splitting method. It works by splitting groups of colliding devices 12 into subsets that are resolved in turn. The splitting method can also be viewed as a type of tree search. Each split moves the method one level deeper in the tree. Either depth-first or breadth-first traversals of the tree can be employed. Depth first traversals are performed by using recursion, as is employed in the code listed above. Breadth-first traversals are accomplished by using a queue instead of recursion.

Either depth-first or breadth-first traversals of the tree can be employed. Depth first traversals are performed by using recursion, as is employed in the code listed above. Breadth-first traversals are accomplished by using a queue instead of recursion. The following is an example of code for performing a breadth-first traversal.

```
Arbitrate(AMASK, AVALUE)
  {
    enqueue(0,0)
    while (queue !=empty)
      (AMASK,AVALUE)=dequeue( )
      collision=IdentifyCmnd(AMASK, AVALUE)
      if (collision) then
      {
        TEMP=AMASK+1
        NEW_AMASK=(AMASK<<1)+1
        enqueue(NEW_AMASK, AVALUE)
        enqueue(NEW_AMASK, AVALUE+TEMP)
        } /* endif */
  endwhile
  }/* return */.
```

The symbol "!=" means not equal to. AVALUE and AMASK would have values such as those indicated in the following table for such code.

| AVALUE | AMASK |
|---|---|
| 0000 | 0000 |
| 0000 | 0001 |
| 0001 | 0001 |
| 0000 | 0011 |
| 0010 | 0011 |
| 0001 | 0011 |
| 0011 | 0011 |
| 0000 | 0111 |
| 0100 | 0111 |
| . . . | . . . |

Rows in the table for which the interrogator is successful in receiving a reply without collision are marked with the symbol "*".

Figure 5:
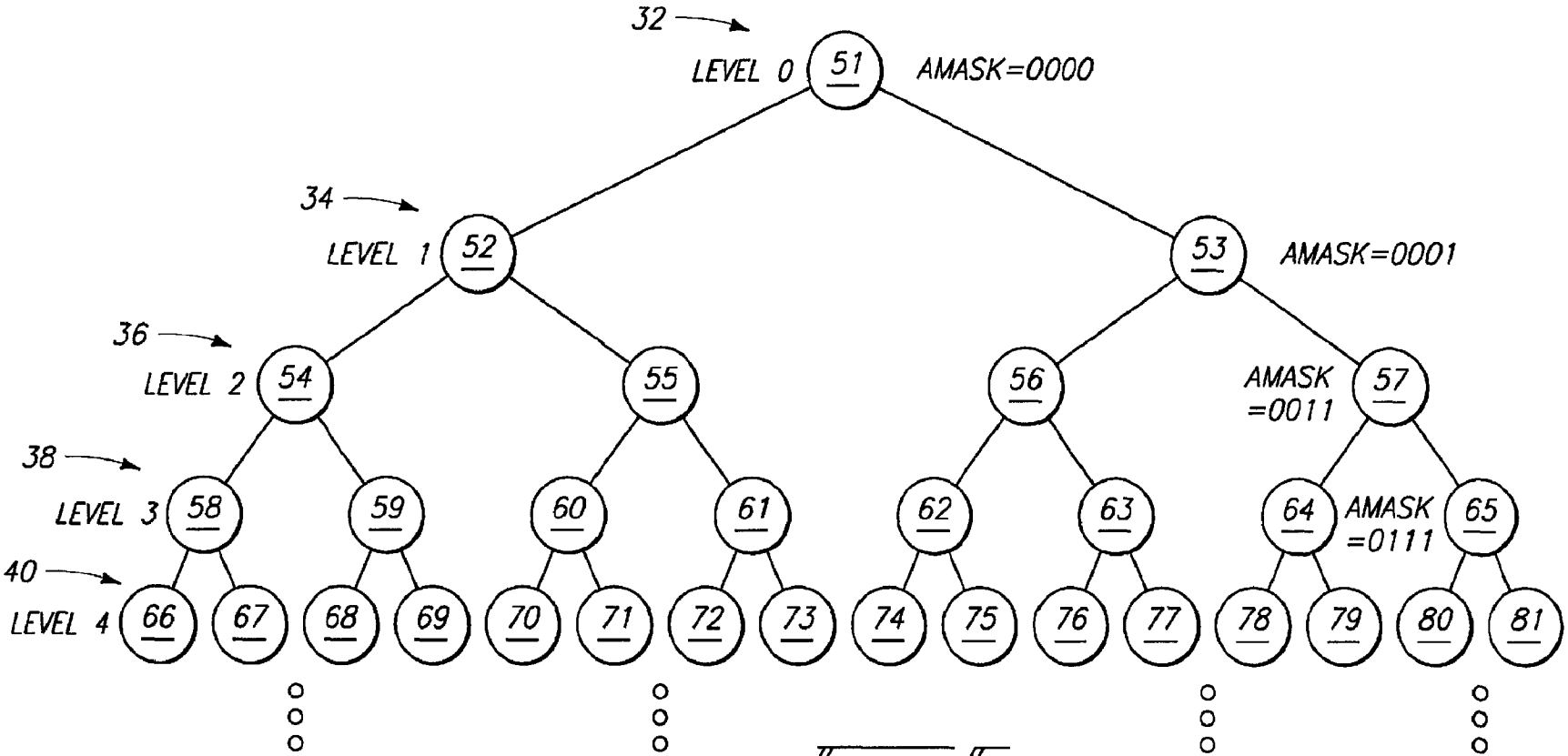
FIG. 5. is a diagram illustrating a modified tree splitting sort method for establishing communication with a radio frequency identification device in a field of a plurality of such devices.

FIG. 5 illustrates an embodiment wherein the interrogator 26 retries on the same node that yielded a good reply. The search tree has a plurality of nodes 51, 52, 53, 54 etc. at respective levels 32, 34, 36, 38, or 40. The size of subgroups of random values decrease in size by half with each node descended.

The interrogator performs a tree search, either depth-first or breadth-first in a manner such as that described in connection with FIG. 4, except that if the interrogator determines that no collision occurred in response to an Identify command, the interrogator repeats the command at the same node. This takes advantage of an inherent capability of the devices, particularly if the devices use backscatter communication, called self-arbitration. Arbitration times can be reduced, and battery life for the devices can be increased.

When a single reply is read by the interrogator, for example, in node 52, the method described in connection with FIG. 4 would involve proceeding to node 53 and then sending another Identify command. Because a device 12 in a field of devices 12 can override weaker devices, this embodiment is modified such that the interrogator retries on the same node 52 after silencing the device 12 that gave the good reply. Thus, after receiving a good reply from node 52, the interrogator remains on node 52 and reissues the Identify command after silencing the device that first responded on node 52. Repeating the Identify command on the same node often yields other good replies, thus taking advantage of the devices natural ability to self-arbitrate.

AVALUE and AMASK would have values such as the following for a depth-first traversal in a situation similar to the one described above in connection with FIG. 4.

| AVALUE | AMASK |
|---|---|
| 0000 | 0000 |
| 0000 | 0001 |
| 0000 | 0011 |
| 0000 | 0111 |
| 0000 | 1111* |
| 0000 | 1111* |
| 1000 | 1111* |
| 1000 | 1111* |
| 0100 | 0111 |
| 0100 | 1111* |
| 0100 | 1111* |
| 1100 | 1111* |
| 1100 | 1111* |

Rows in the table for which the interrogator is successful in receiving a reply without collision are marked with the symbol "*".

In operation, the interrogator transmits a command at a node, requesting that devices within the subgroup represented by the node respond. The interrogator determines if a collision occurs in response to the command and, if not, repeats the command at the same node.

In one alternative embodiment, the upper bound of the number of devices in the field (the maximum possible number of devices that could communicate with the interrogator) is determined, and the tree search method is started at a level 32, 34, 36, 38, or 40 in the tree depending on the determined upper bound. The level of the search tree on which to start the tree search is selected based on the determined maximum possible number of wireless identification devices that could communicate with the interrogator. The tree search is started at a level determined by taking the base two logarithm of the determined maximum possible number. More particularly, the tree search is started at a level determined by taking the base two logarithm of the power of two nearest the determined maximum possible number of devices 12. The level of the tree containing all subgroups of random values is considered level zero, and lower levels are numbered 1, 2, 3, 4, etc. consecutively.

Methods involving determining the upper bound on a set of devices and starting at a level in the tree depending on the determined upper bound are described in a commonly assigned [patent application (attorney docket MI40-118)] *U.S. Pat. No. 6,118,789,* naming Clifton W. Wood, Jr. as an inventor, titled "Method of Addressing Messages and Communications System," [filed concurrently herewith, and] *which is* incorporated herein by reference.

In one alternative embodiment, a method involving starting at a level in the tree depending on a determined upper bound (such as the method described in the commonly assigned patent application mentioned above) is combined with a method comprising re-trying on the same node that gave a good reply, such as the method shown and described in connection with FIG. 5.

Another arbitration method that can be employed is referred to as the "Aloha" method. In the Aloha method, every time a device 12 is involved in a collision, it waits a random period of time before retransmitting. This method can be improved by dividing time into equally sized slots and forcing transmissions to be aligned with one of these slots. This is referred to as "slotted Aloha." In operation, the interrogator asks all devices 12 in the field to transmit their identification numbers in the next time slot. If the response is garbled, the interrogator informs the devices 12 that a collision has occurred, and the slotted Aloha scheme is put into action. This means that each device 12 in the field responds within an arbitrary slot determined by a randomly selected value. In other words, in each successive time slot, the devices 12 decide to transmit their identification number with a certain probability.

The Aloha method is based on a system operated by the University of Hawaii. In 1971, the University of Hawaii began operation of a system named Aloha. A communication satellite was used to interconnect several university computers by use of a random access protocol. The system operates as follows. Users or devices transmit at any time they desire. After transmitting, a user listens for an acknowledgment from the receiver or interrogator. Transmissions from different users will sometimes overlap in time (collide), causing reception errors in the data in each of the contending messages. The errors are detected by the receiver, and the receiver sends a negative acknowledgment to the users. When a negative acknowledgment is received, the messages are retransmitted by the colliding users after a random delay. If the colliding users attempted to retransmit without the random delay, they would collide again. If the user does not receive either an acknowledgment or a negative acknowledgment within a certain amount of time, the user "times out" and retransmits the message.

There is a scheme known as slotted Aloha which improves the Aloha scheme by requiring a small amount of coordination among stations. In the slotted Aloha scheme, a sequence of coordination pulses is broadcast to all stations (devices). As is the case with the pure Aloha scheme, packet lengths are constant. Messages are required to be sent in a slot time between synchronization pulses, and can be started only at the beginning of a time slot. This reduces the rate of collisions because only messages transmitted in the same slot can interfere with one another. The retransmission mode of the pure 11 Aloha scheme is modified for slotted Aloha such that if a negative acknowledgment occurs, the device retransmits after a random delay of an integer number of slot times.

Aloha methods are described in a commonly assigned [patent application (attorney docket MI40-089)] *U.S. Pat. No. 6,275,476,* naming Clifton W. Wood, Jr. as an inventor, titled "Method of Addressing Messages and Communications System," [filed concurrently herewith, and] *which is* incorporated herein by reference.

In one alternative embodiment, an Aloha method (such as the method described in the commonly assigned patent application mentioned above) is combined with a method involving re-trying on the same node that gave a good reply, such as the method shown and described in connection with FIG. 5.

In another embodiment, levels of the search tree are skipped. Skipping levels in the tree, after a collision caused by multiple devices 12 responding, reduces the number of subsequent collisions without adding significantly to the number of no replies. In real-time systems, it is desirable to have quick arbitration sessions on a set of devices 12 whose unique identification numbers are unknown. Level skipping reduces the number of collisions, both reducing arbitration time and conserving battery life on a set of devices 12. In one embodiment, every other level is skipped. In alternative embodiments, more than one level is skipped each time.

The trade off that must be considered in determining how many (if any) levels to skip with each decent down the tree is as follows. Skipping levels reduces the number of collisions, thus saving battery power in the devices 12. Skipping deeper (skipping more than one level) further reduces the number of collisions. The more levels that are skipped, the greater the reduction in collisions. However, skipping levels results in longer search times because the number of queries (Identify commands) increases. The more levels that are skipped, the longer the search times. Skipping just one level has an almost negligible effect on search time, but drastically reduces the number of collisions. If more than one level is skipped, search time increases substantially. Skipping every other level drastically reduces the number of collisions and saves battery power without significantly increasing the number of queries.

Level skipping methods are described in a commonly assigned [patent application (attorney docket MI40-117)] *U.S. Pat. No. 6,072,801,* naming Clifton W. Wood, Jr. and Don Hush as inventors, titled "Method of Addressing Messages, Method of Establishing Wireless Communications, and Communications System," [filed concurrently herewith, and] *which is* incorporated herein by reference.

In one alternative embodiment, a level skipping method is combined with a method involving re-trying on the same node that gave a good reply, such as the method shown and described in connection with FIG. 5.

In yet another alternative embodiment, any two or more of the methods described in the commonly assigned, concurrently filed, applications mentioned above are combined.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

[1. A method of establishing wireless communications between an interrogator and wireless identification devices, the method comprising utilizing a tree search technique to establish communications, without collision, between the interrogator and individual ones of the multiple wireless identification devices, the method including using a search tree having multiple nodes respectively representing subgroups of the multiple wireless identification devices, the method further comprising, for a node, transmitting a command, using the interrogator, requesting that devices within the subgroup represented by the node respond, determining with the interrogator if a collision occurred in response to the command and, if not, repeating the command at the same node.]

[2. A method in accordance with claim 1 and further comprising, if a collision occurred in response to the first mentioned command, sending a command at a different node, using the interrogator.]

[3. A method in accordance with claim 1 wherein when a subgroup contains both a device that is within communications range of the interrogator, and a device that is not within communications range of the interrogator, the device that is not within communications range of the interrogator does not respond to the command.]

[4. A method in accordance with claim 1 wherein when a subgroup contains both a device that is within communications range of the interrogator, and a device that is not within communications range of the interrogator, the device that is within communications range of the interrogator responds to the command.]

[5. A method in accordance with claim 1 wherein a device in a subgroup changes between being within communications range of the interrogator and not being within communications range, over time.]

[6. A method in accordance with claim 1 wherein the wireless identification device comprises an integrated circuit including a receiver, a modulator, and a microprocessor in communication with the receiver and modulator.]

[7. A method of addressing messages from an interrogator to a selected one or more of a number of communications devices, the method comprising:

establishing for respective devices unique identification numbers;

causing the devices to select random values, wherein respective devices choose random values independently of random values selected by the other devices;

transmitting a communication, from the interrogator, requesting devices having random values within a first specified group of random values to respond;

receiving the communication at multiple devices, devices receiving the communication respectively determining if the random value chosen by the device falls within the first specified group and, if so, sending a reply to the interrogator; and determining using the interrogator if a collision occurred between devices that sent a reply and, if so, creating a second specified group smaller than the first specified group; and, if not, again transmitting a communication requesting devices having random values within the first specified group of random values to respond.]

[8. A method of addressing messages from an interrogator to a selected one or more of a number of communications devices in accordance with claim 7 wherein sending a reply to the interrogator comprises transmitting the unique identification number of the device sending the reply.]

[9. A method in accordance with claim 7 wherein one of the first and second specified groups contains both a device that is within communications range of the interrogator, and a device that is not within communications range of the interrogator, and wherein the device that is not within communications range of the interrogator does not respond to the interrogator.]

[10. A method of addressing messages from an interrogator to a selected one or more of a number of communications devices in accordance with claim 7 wherein, after receiving a reply without collision from a device, the interrogator sends a communication individually addressed to that device.]

[11. A method of addressing messages from a transponder to a selected one or more of a number of communications devices, the method comprising:

establishing unique identification numbers for respective devices;

causing the devices to select random values, wherein respective devices choose random values independently of random values selected by the other devices;

transmitting a communication from the transponder requesting devices having random values within a specified group of a plurality of possible groups of random values to respond, the plurality of possible groups being organized in a binary tree defined by a plurality of nodes at respective levels, the specified group being defined as being at one of the nodes;

receiving the communication at multiple devices, devices receiving the communication respectively determining if the random value chosen by the device falls within the specified group and, if so, sending a reply to the transponder; and, if not, not sending a reply; and determining using the transponder if a collision occurred between devices that sent a reply and, if so, creating a new, smaller, specified group by descending in the tree; and, if not, transmitting a communication at the same node.]

[12. A method of addressing messages from a transponder to a selected one or more of a number of communications devices in accordance with claim 11 wherein establishing unique identification numbers for respective devices comprises establishing a predetermined number of bits to be used for the unique identification numbers.]

[13. A method of addressing messages from a transponder to a selected one or more of a number of communications devices in accordance with claim 12 and further including establishing a predetermined number of bits to be used for the random values.]

[14. A method of addressing messages from an interrogator to a selected one or more of a number of RFID devices, the method comprising:

establishing for respective devices unique identification numbers;

causing the devices to select random values, wherein respective devices choose random values independently of random values selected by the other devices;

transmitting a command using the interrogator requesting devices having random values within a specified group of a plurality of possible groups of random values to respond, the specified group being equal to or less than the entire set of random values, the plurality of possible groups being organized in a binary tree defined by a plurality of nodes at respective levels;

receiving the command at multiple RFID devices, RFID devices receiving the command respectively determining if their chosen random values fall within the specified group and, only if so, sending a reply to the interrogator, wherein sending a reply to the interrogator comprises transmitting the unique identification number of the device sending the reply;

determining using the interrogator if a collision occurred between devices that sent a reply and, if so, creating a new, smaller, specified group using a different level of the tree, the interrogator transmitting a command requesting devices having random values within the new specified group of random values to respond; and, if not, the interrogator re-transmitting a command requesting devices having random values within the first mentioned specified group of random values to respond; and if a reply without collision is received from a device, the interrogator subsequently sending a command individually addressed to that device.]

[15. A method of addressing messages from an interrogator to a selected one or more of a number of RFID devices in accordance with claim 14 wherein the first mentioned specified group contains both a device that is within communications range of the interrogator, and a device that is not within communications range of the interrogator, and wherein the device that is not within communications range of the interrogator does not respond to the transmitting of the command or the re-transmitting of the command.]

[16. A method of addressing messages from an interrogator to a selected one or more of a number of RFID devices in accordance with claim 14 wherein the first mentioned specified group contains both a device that is within communications range of the interrogator, and a device that is not within communications range of the interrogator, and wherein the device that is within communications range of the interrogator responds to the transmitting of the command and the re-transmitting of the command.]

[17. A method of addressing messages from an interrogator to a selected one or more of a number of RFID devices in accordance with claim 14 wherein a device in the first mentioned specified group is capable of changing between being within communications range of the interrogator and not being within communications range of the interrogator over time.]

[18. A method of addressing messages from an interrogator to a selected one or more of a number of RFID devices in accordance with claim 14 wherein the devices respectively comprise an integrated circuit including a receiver, a modulator, and a microprocessor in communication with the receiver and modulator.]

[19. A method of addressing messages from an interrogator to a selected one or more of a number of RFID devices in accordance with claim 14 and further comprising, after the interrogator transmits a command requesting devices having random values within the new specified group of random values to respond;

devices receiving the command respectively determining if their chosen random values fall within the new smaller specified group and, if so, sending a reply to the interrogator.]

[20. A method of addressing messages from an interrogator to a selected one or more of a number of RFID devices in accordance with claim 19 and further comprising, after the interrogator transmits a command requesting devices having random values within the new specified group of random values to respond;

determining if a collision occurred between devices that sent a reply and, if so, creating a new specified group and repeating the transmitting of the command requesting devices having random values within a specified group of random values to respond using different specified groups until all of the devices capable of communicating with the interrogator are identified.]

[21. A communications system comprising an interrogator, and a plurality of wireless identification devices configured to communicate with the interrogator using RF, the interrogator being configured to employ tree searching to attempt to identify individual ones of the multiple wireless identification devices, so as to be able to perform communications without collision between the interrogator and individual ones of the multiple wireless identification devices, the interrogator being configured to follow a search tree, the tree having multiple nodes respectively representing subgroups of the multiple wireless identification devices, the interrogator being configured to transmit a command at a node, requesting that devices within the subgroup represented by the node respond, the interrogator further being configured to determine if a collision occurs in response to the command and, if not, to repeat the command at the same node.]

[22. A communications system in accordance with claim 21 wherein the interrogator is configured to send a command at a different node if a collision occurs in response to the first mentioned command.]

[23. A communications system in accordance with claim 21 wherein a subgroup contains both a device that is within communications range of the interrogator, and a device that is not within communications range of the interrogator.]

[24. A communications system in accordance with claim 21 wherein a subgroup contains both a device that is within communications range of the interrogator, and a device that is not within communications range of the interrogator, and wherein the device that is within communications range of the interrogator responds to the command.]

[25. A communications system in accordance with claim 21 wherein a device in a subgroup is movable relative to the interrogator so as to be capable of changing between being within communications range of the interrogator and not being within communications range.]

[26. A communications system in accordance with claim 21 wherein the wireless identification device comprises an integrated circuit including a receiver, a modulator, and a microprocessor in communication with the receiver and modulator.]

[27. A system comprising:

an interrogator;

a number of communications devices capable of wireless communications with the interrogator;

means for establishing for respective devices unique identification numbers respectively having the first predetermined number of bits;

means for causing the devices to select random values, wherein respective devices choose random values independently of random values selected by the other devices;

means for causing the interrogator to transmit a command requesting devices having random values within a specified group of random values to respond;

means for causing devices receiving the command to determine if their chosen random values fall within the specified group and, if so, to send a reply to the interrogator; and means for causing the interrogator to determine if a collision occurred between devices that sent a reply and, if so, to create a new, smaller, specified group; and, if not, transmit a command requesting devices having random values within the same specified group of random values to respond.]

[28. A system in accordance with claim 27 wherein sending a reply to the interrogator comprises transmitting the unique identification number of the device sending the reply.]

[29. A system in accordance with claim 27 wherein a specified group contains both a device that is within communications range of the interrogator, and a device that is not within communications range of the interrogator.]

[30. A system in accordance with claim 27 wherein the interrogator further includes means for, after receiving a reply without collision from a device, sending a command individually addressed to that device.]

[31. A system comprising:

an interrogator configured to communicate to a selected one or more of a number of communications devices; and a plurality of communications devices; the devices being configured to select random values, wherein respective devices choose random values independently of random values selected by the other devices; the interrogator being configured to transmit a command requesting devices having random values within a specified group of a plurality of possible groups of random values to respond, the specified group being less than the entire set of random values, the plurality of possible groups being organized in a binary tree defined by a plurality of nodes at respective levels, the specified group being defined as being at one of the nodes; devices receiving the command being configured to respectively determine if their chosen random values fall within the specified group and, only if so, send a reply to the interrogator, wherein sending a reply to the interrogator comprises transmitting the unique identification number of the device sending the reply; the interrogator being configured to determine if a collision occurred between devices that sent a reply and, if so, create a new, smaller, specified group using a different level of the tree, the interrogator being configured to transmit a command requesting devices having random values within the new specified group of random values to respond; and, if not, the interrogator being configured to re-transmit a command requesting devices having random values within the first mentioned specified group of random values to respond.]

[32. A system in accordance with claim 31 wherein the first mentioned specified group contains both a device that is within communications range of the interrogator, and a device that is not within communications range of the interrogator.]

[33. A system in accordance with claim 31 wherein a device in the first mentioned specified group is capable of changing between being within communications range of the interrogator and not being within communications range of the interrogator over time.]

[34. A system in accordance with claim 31 wherein the respective devices comprise an integrated circuit including a receiver, a modulator, and a microprocessor in communication with the receiver and modulator.]

[35. A system comprising:

an interrogator configured to communicate to a selected one or more of a number of RFID devices;

a plurality of RFID devices, respective devices being configured to store a unique identification number, respective devices being further configured to store a random value;

the interrogator being configured to transmit a command requesting devices having random values within a specified group of a plurality of possible groups of random values to respond, the plurality of possible groups being organized in a binary tree defined by a plurality of nodes at respective levels, the specified group being defined as being at one of the nodes;

devices receiving the command respectively being configured to determine if their chosen random values fall within the specified group and, if so, send a reply to the interrogator; and, if not, not send a reply; and the interrogator being configured to determine if a collision occurred between devices that sent a reply and, if so, to create a new, smaller, specified group by descending in the tree; and, if not, to transmit a command at the same node.]

[36. A system in accordance with claim 35 wherein the unique identification numbers for respective devices are stored in digital form and respectively comprise a predetermined number of bits.]

[37. A system in accordance with claim 35 wherein the random values for respective devices are stored in digital form and respectively comprise a predetermined number of bits.]

[38. A system in accordance with claim 35 wherein the interrogator is configured to determine if a collision occurred between devices that sent a reply in response to respective Identify commands and, if so, to create further new specified groups and repeat the transmitting of the command requesting devices having random values within a specified group of random values to respond using different specified groups until all responding devices capable of responding are identified.]

*39. A method, comprising:*

*receiving a first signal from an interrogator in accordance with an algorithm to identify a radio frequency identification (RFID) device in a field of the interrogator, the first signal having associated therewith a first set of bits and requesting a response from one or more RFID devices in the field selected in accordance with at least the first set of bits;*

*responsive to receiving the first signal, determining if the first set of bits matches a first portion of an identifier of the RFID device, and, if so, modulating a radio frequency (RF) field, provided by the interrogator, to communicate a reply to the interrogator in accordance with the algorithm; and*

*receiving, in accordance with the algorithm, another transmission of the first signal from the interrogator in response to the interrogator receiving the reply without detecting a collision.*

*40. The method of claim 39, further comprising communicating with the interrogator in one of a first communication mode and a second communication mode determined by the interrogator, wherein in accordance with the first communication mode the RFID device modulates a radio frequency (RF) field generated by the RFID device and in accordance with the second communication mode the RFID device modulates a radio frequency (RF field generated by the interrogator.*

*41. The method of claim 40, further comprising communicating with the interrogator at one of a plurality of bit rates determined by the interrogator.*

*42. The method of claim 39, further comprising receiving a wake up command from the interrogator and, in response, transitioning from a sleep state.*

*43. The method of claim 42, further comprising receiving a sleep command from the interrogator.*

*44. The method of claim 43, wherein the sleep command is received in response to the interrogator receiving the reply without detecting a collision, in accordance with the algorithm, before the receiving of the retransmission of the first signal.*

*45. The method of claim 39, wherein the reply comprises a random value generated by the RFID device.*

*46. The method of claim 45, wherein the identifier comprises the random value.*

*47. The method of claim 46, wherein the random value is the identifier.*

*48. The method of claim 39, further comprising:*

*receiving, in accordance with the algorithm, a second signal from the interrogator in response to the interrogator detecting a collision in the reply, the second signal comprising a second set of bits and requesting a response from one or more RFID devices in the field selected in accordance with at least the second set of bits; and*

*responsive to receiving the second signal, determining if the second set of bits matches a second portion of the identifier of the RFID device, and, if so, modulating the radio frequency (RF) field to communicate a second reply to the interrogator in accordance with the algorithm, wherein the second signal comprises the first signal, the second set of bits comprises the first set of bits plus at least two additional bits, and the second portion of the identifier comprises the first portion of the identifier.*

*49. The method of claim 48, wherein the second reply comprises at least a portion of the identifier.*

*50. The method of claim 49, further comprising communicating a random value to the interrogator during a time slot randomly selected from a number of time slots.*

*51. The method of claim 39, further comprising communicating a random value to the interrogator during a time slot randomly selected from a number of time slots.*

*52. A system, comprising:*

*a radio frequency identification (RFID) device comprising a receiver to receive a first command including a portion of an identification number, memory to store an identifier of the device, and a transmitter to communicate a reply to the first command if the portion of the identification number matches a first portion of the identifier; and*

*an interrogator configured to implement an algorithm to identify one or more RFID devices in a field of the interrogator, the algorithm comprising transmitting a first signal with a first set of bits to request a response from a selected one or more devices, receiving a first response thereto from the selected one or more devices, detecting if a collision occurred in the first response, and retransmitting the first signal with at least the first set of bits to request a second response from at least one of the selected one or more devices in response to detecting no collision in the first response.*

*53. The system of claim 52, further comprising memory storing a unique identification code to be transmitted by the system.*

*54. The system of claim 52, wherein the transmitter is configured to communicate by modulating a radio frequency (RF) field provided by a remote device.*

*55. The system of claim 54, wherein the algorithm further comprises transmitting an indication of the number of bits of the first set of bits.*

*56. The system of claim 52, wherein retransmitting the first signal with at least the first set of bits comprises retransmitting the first signal with no more than the first set of bits.*

*57. The system of claim 52, wherein the system is configured to communicate at one of a plurality of bit rates determined by a remote device.*

*58. The system of claim 57, wherein the system is configured to operate in a first communication mode during a first period of time and in a second communication mode during a second period of time, wherein in accordance with the first communication mode the system is configured to modulate a radio frequency (RF) field generated by the remote device and in accordance with the second communication mode the system is configured to generate and modulate a radio frequency (RF) field.*

*59. The system of claim 52, wherein the RFID device is configured to receive a signal to silence the RFID device.*

*60. The system of claim 59, wherein the RFID device is configured to receive a wake up command and, in response, to transition from a sleep state.*

*61. The system of claim 52, wherein the algorithm further comprises transmitting a signal to silence at least one of the one or more RFID devices in response to the detecting no collision and before the retransmitting of the first signal.*

*62. The system of claim 52, wherein the reply comprises at least a second portion of the identifier that is not part of the first portion of the identifier.*

*63. The system of claim 62, wherein the interrogator is further configured to use the first response to determine a random value generated by the selected one or more devices in accordance with the algorithm.*

*64. The system of claim 52, wherein the algorithm further comprises transmitting a second signal from the interrogator in response to detecting a collision in the first response, the second signal comprising a second set of bits and requesting a response from at least one of the one or more RFID devices in the field selected in accordance with at least the second set of bits, wherein the second set of bits includes the first set of bits plus at least one additional bit.*

*65. The system of claim 64, wherein the interrogator is configured to generate, as part of the algorithm, the second set of bits including the first set of bits plus at least two additional bits.*

*66. The system of claim 52, wherein the RFID device is configured to communicate a random value during a first time slot randomly selected from a first number of timeslots.*

*67. The system of claim 66, wherein the transmitter is configured to communicate by modulating a radio frequency (RF) field provided by a remote device.*

*68. The system of claim 67, wherein the random value identifies the device to the remote device.*

*69. The system of claim 68, wherein the RFID device is further configured to communicate the random value to the remote device during a second time slot randomly selected from a second number of time slots, wherein the first number of time slots is different from the second number of time slots and is indicated by the remote device.*

*70. The system of claim 69, wherein the algorithm further comprises transmitting a second signal from the interrogator in response to detecting a collision in the first response, the second signal comprising a second set of bits and requesting*

*a response from at least one of the one or more RFID devices in the field selected in accordance with at least the second set of bits, wherein, in accordance with the algorithm, the second set of bits include at least two bits in addition to the first set of bits.*

*71. An apparatus for wirelessly reading at least one radio frequency identification (RFID) device, comprising:*

*a transmitter to transmit a command along with a first portion of a set of identifiers to request a response from at least one RFID device that has an identifier in the set;*

*an antenna to provide a radio frequency (RF) field to be modulated by the device;*

*a receiver to receive the response; and*

*processing circuitry to perform collision detection, to determine the identifier using the response, and to cause the transmitter to retransmit the command along with at least the first portion of the set of identifiers responsive to detecting no collision in the response.*

*72. The apparatus of claim 71, wherein the transmitter is configured to transmit the command along with an indication of the number of bits of the first portion.*

*73. The apparatus of claim 72, wherein the transmitter is configured to communicate with the least one RFID device at one of a plurality of bit rates determined by the apparatus.*

*74. The apparatus of claim 71, wherein the processing circuitry is configured to cause the transmitter to retransmit the command along with no more than the first portion of the set of identifiers responsive to the detecting.*

*75. The apparatus of claim 71, wherein the processing circuitry is configured to cause the transmitter to transmit a signal addressed to the least one RFID device responsive to receiving the response without collision.*

*76. The apparatus of claim 75, wherein the signal is configured to place the least one RFID device in a listen-only mode.*

*77. The apparatus of claim 76, wherein the processing circuitry is configured to cause the transmitter to transmit the signal to place the least one RFID device into a listen-only state before causing the transmitter to retransmit the command.*

*78. The apparatus of claim 71, wherein the transmitter is configured to transmit a wake up command to transition the least one RFID device from a sleep state.*

*79. The apparatus of claim 71, wherein the response comprises at least a second portion of the identifier that is not part of the first portion.*

*80. The apparatus of claim 79, wherein the processing circuitry is configured to determine a unique identification code stored in the least one RFID device in addition to the identifier.*

*81. The apparatus of claim 71, wherein the processing circuitry is configured to specify a second portion of the set of identifiers in response to detecting a collision, the second portion being a subset of the first portion.*

*82. The apparatus of claim 81, wherein the processing circuitry is further configured to enable the second portion to be less than half of the first portion.*

*83. The apparatus of claim 82, wherein the receiver is to receive a reply from one or more RFID devices in one of a number of time slots indicated by the apparatus to the one or more RFID devices.*

*84. The apparatus of claim 83, wherein the reply comprises a random value generated by the one or more RFID devices.*

*85. The apparatus of claim 71, wherein the processing circuitry is further configured to cause the transmitter to transmit a signal to indicate a number of time slots in which one or more RFID devices responds to the apparatus with a reply.*

*86. The apparatus of claim 85, wherein the reply comprises a random value generated by the one or more RFID devices.*

*87. The apparatus of claim 86, wherein the one or more RFID devices comprises the RFID device and the random value matches the identifier value.*

*88. The apparatus of claim 71, wherein the identifier identifies the device to the apparatus.*

*89. The wireless apparatus of claim 71, wherein the wireless apparatus is at least partially disposed within a card.*

*90. The wireless apparatus of claim 89, wherein the card is at least partially plastic.*

*91. The wireless apparatus of claim 89, wherein the card comprises a card useful for paying for goods or services.*

*92. The wireless apparatus of claim 71, the wireless apparatus is substantially disposed in a form factor suitable for use within a vehicle, and is capable of interfacing with a toll booth.*

*93. The wireless apparatus of claim 92, wherein the form factor comprises a means for affixing the form factor to an object.*

*94. The method of claim 39, wherein the act communicating a reply to the interrogator is performed as a part of a payment for goods or services.*

*95. The method of claim 39, further comprising disposing the RFID device at least partially within a card.*

*96. The method of claim 95, wherein the card comprises a card useful for paying for goods or services.*

*97. The method of claim 95, further comprising disposing visual identification information on a front side of the card, said visual identification information identifying a financial entity.*

*98. The method of claim 39, further comprising disposing RFID device in a form factor suitable for use within a vehicle.*

*99. The method of claim 39, wherein the form factor comprises a means for affixing the form factor to an object.*

*100. The method of claim 39, wherein the communication of a reply to the interrogator is performed as a part of a payment for a toll for use of a roadway.*

*101. The method of claim 39, further comprising effecting an interface between the RFID device and a toll booth.*

*102. Wireless apparatus, comprising:*

*first apparatus configured to receive a command signal from an interrogator in accordance with an algorithm to identify a radio frequency identification (RFID) device in a field of the interrogator, the first command comprising a first set of bits and requesting a response from one or more RFID devices in the field selected in accordance with at least the first set of bits; and*

*logic configured to, responsive to receiving the first command, determine whether the first set of bits matches a first portion of an identifier of the RFID device; and*

*a second apparatus configured to modulate a radio frequency (RF) field provided by the interrogator in order to communicate a reply to the interrogator in accordance with the algorithm;*

*wherein said first apparatus is further configured to receive a second transmission of the first command from the interrogator in response to the interrogator receiving the reply without detecting a collision; and*

*wherein said communication of the reply is performed based at least in part on said determination of whether the first set of bits matches a first portion of an identifier of the RFID device.*

*103. The wireless apparatus of claim 102, wherein the wireless apparatus is at least partially disposed within a card.*

*104. The wireless apparatus of claim 103, wherein the card is at least partially plastic.*

*105. The wireless apparatus of claim 103, wherein the card comprises a payment card comprising visual identification information disposed on a front side of the card.*

*106. The wireless apparatus of claim 102, wherein the wireless apparatus is substantially disposed in a form factor suitable for use within a vehicle, and is capable of interfacing with a toll booth.*

*107. The wireless apparatus of claim 106, wherein the form factor comprises a means for affixing the form factor to an object.*

*108. The wireless apparatus of claim 102, wherein:*

*the first apparatus is further configured to communicate with the interrogator in one of a first communication mode and a second communication mode determined by the interrogator;*

*in accordance with the first communication mode, the RFID device modulates a radio frequency (RF) field generated by the RFID device; and*

*in accordance with the second communication mode, the RFID device modulates a radio frequency (RF) field generated by the interrogator.*

*109. The wireless apparatus of claim 108, wherein the second apparatus is further configured to communicate with the interrogator at one of a plurality of bit rates determined by the interrogator.*

*110. The wireless apparatus of claim 102, wherein the first apparatus is further configured to receive a wake up command from the interrogator; and*

*in response, to transition from a sleep state.*

*111. The wireless apparatus of claim 110, wherein the first apparatus is further configured to receive a sleep command from the interrogator.*

*112. The wireless apparatus of claim 111, wherein the sleep command is received in response to the interrogator receiving the reply without detecting a collision, in accordance with the algorithm, before the receiving of the retransmission of the first command.*

*113. The wireless apparatus of claim 102, wherein the reply comprises a random value generated by the RFID device.*

*114. The wireless apparatus of claim 113, wherein the identifier comprises the random value.*

*115. The wireless apparatus of claim 102, wherein the first apparatus is further configured to:*

*receive, in accordance with the algorithm, a second command from the interrogator in response to the interrogator detecting a collision in the reply, the second command comprising a second set of bits and requesting a response from one or more RFID devices in the field selected in accordance with at least the second set of bits; and*

*responsive to receive the second command, determine if the second set of bits matches a second portion of the identifier of the RFID device, and, if so, modulate the radio frequency (RF) field to communicate a second reply to the interrogator in accordance with the algorithm;*

*wherein:*

*the second command comprises the first command;*

*the second set of bits comprises the first set of bits plus at least two additional bits; and*

*the second portion of the identifier comprises the first portion of the identifier.*

*116. The wireless apparatus of claim 115, wherein the second reply comprises at least a portion of the identifier.*

*117. The wireless apparatus of claim 102, wherein the second apparatus is further configured to communicate a random value to the interrogator during a time slot randomly selected from a number of time slots.*

*118. A method for wirelessly reading at least one radio frequency identification (RFID) device, comprising:*

*transmitting a command along with a first portion of a set of identifiers to request a response from the at least one RFID device that has an identifier in the set, the command being transmitted via an antenna configured to provide a radio frequency (RF) field to be modulated by the least one RFID device;*

*receiving the response; and*

*performing collision detection to determine the identifier using the response, and to cause the transmitter to transmit the command a second time along with at least the first portion of the set of identifiers responsive to detecting no collision.*

*119. The method of claim 118, wherein the command transmission comprises an indication of the number of bits of the first portion.*

*120. The method of claim 119, wherein the transmission is performed at one of a plurality of bit rates.*

*121. The method of claim 118, further comprising transmitting the command said second time along with no more than the first portion of the set of identifiers responsive to the said detection of no collision.*

*122. The method of claim 118, further comprising transmitting a signal addressed to the at least one RFID device responsive to receiving the response to without detecting a collision.*

*123. The method of claim 122, wherein the signal is configured to place the least one RFID device into a listen-only state.*

*124. The method of claim 122, wherein the act of transmitting the signal to place the at least one RFID device into a listen-only state precedes the act of retransmitting of the command.*

*125. The method of claim 118, wherein the response comprises at least a second portion of the identifier that is not part of the first portion.*

*126. The method of claim 125, further comprising determining a unique identification code stored in the at least one RFID device in addition to the identifier.*

*127. The method of claim 118, further comprising specifying a second portion of the set of identifiers in response to detecting a collision, the second portion being a subset of the first portion.*

*128. The method of claim 127, further comprising enabling the second portion to be less than half of the first portion.*

*129. The method of claim 128, wherein the reply comprises a random value generated by the one or more RFID devices.*

*130. The method of claim 118, further comprising:*

*providing to the at least one RFID devices a number of time slots;*

*causing the response from the at least one RFID device within at least one of the number if time slots; and*

*receiving the response in the at least one of the number of time slots.*

*131. The method of claim 130, wherein the random value matches the identifier value.*

*132. The method of claim 118, wherein the act wirelessly reading the at least one RFID device is performed as part of a payment for goods or services.*

*133. The method of claim 118, further comprising disposing the at least one RFID device at least partly within a card.*

*134. The method of claim 133, wherein the card comprises a payment card useful for paying for goods or services.*

*135. The method of claim 134, further comprising disposing visual identification information on a front side of the card, said visual identification information identifying a financial entity.*

*136. The method of claim 118, further comprising disposing the at least one RFID device in a form factor suitable for use within a vehicle.*

*137. The method of claim 136, wherein the form factor comprises a means for affixing the form factor to an object.*

*138. The method of claim 136, further comprising effecting an interface between the at least one RFID device and a toll booth.*

*139. The method of claim 118, wherein the act of wirelessly reading the at least one RFID device is performed as a part of a payment for a toll for use of a roadway.*

*140. A method of wireless communication of data, comprising:*

*receiving a first signal from an interrogator in accordance with an algorithm to identify a radio frequency identification (RFID) device in a field of the interrogator, the first signal comprising a first set of bits and requesting a response from the RFID device in the field selected in accordance with at least the first set of bits;*

*responsive to receiving the first signal:*

*determining if the first set of bits matches a predefined value related to the RFID device; and*

*if so, modulating a radio frequency (RF) field, provided by the interrogator, to communicate a first reply to the interrogator in accordance with the algorithm; and*

*receiving, in accordance with the algorithm, a retransmission from the interrogator of at least a portion of the first reply, in response to the interrogator receiving the first reply without detecting a collision;*

*wherein the first signal further comprises slot information useful for issuing said first reply by said RFID device.*

*141. The method of claim 140, wherein the act of wireless communication of data is performed as a part of a payment for goods or services.*

*142. The method of claim 140, further comprising disposing the RFID device at least partly within a card.*

*143. The method of claim 142, wherein the card comprises a payment card useful for paying for goods or services.*

*144. The method of claim 138, further comprising disposing visual identification information on a front side of the card, said visual identification information identifying a financial entity.*

*145. The method of claim 140, further comprising disposing the one or more RFID devices in a form factor suitable for use within a vehicle.*

*146. The apparatus of claim 145, wherein the form factor comprises a means for affixing the form factor to an object.*

*147. The method of claim 146, further comprising effecting an interface between the RFID device and a toll booth.*

*148. The method of claim 140, wherein the act of wireless communication of data is performed as a part of a payment for a toll for use of a roadway.*

*149. The method of claim 140, further comprising communicating with the interrogator in one of a first communication mode and a second communication mode determined by the interrogator;*

*wherein in accordance with the first communication mode, the RFID device modulates a radio frequency (RF) field generated by the RFID device; and*

*wherein in accordance with the second communication mode, the RFID device modulates a radio frequency (RF) field generated by the interrogator.*

*150. The method of claim 140, further comprising:*

*receiving a wake up command from the interrogator; and in response, transitioning from a sleep state.*

*151. The method of claim 150, further comprising receiving a third signal from the interrogator, the third signal configured to place the RFID device into a listen-only state.*

*152. The method of claim 151, wherein the third signal is received in response to the interrogator receiving the reply without detecting a collision, before the receiving of the retransmission of the first signal.*

*153. The method of claim 140, wherein the reply comprises a random value generated by the RFID device.*

* * * * *